US008391473B2

(12) United States Patent
Delva et al.

(10) Patent No.: US 8,391,473 B2
(45) Date of Patent: Mar. 5, 2013

(54) DEVICE PROVIDING PHONE SERVICES TO PHONES PLUGGED TO A RESIDENTIAL PHONE WIRING THAT IS NOT COUPLED TO A CENTRAL OFFICE TELEPHONE EXCHANGE (75) Inventors: Wouter Delva, Wevelgem (BE); Luc Gyselinck, Sint Niklaas (BE); Johan Deleu, Schelle (BE)

(73) Assignee: Thomson Licensing, Boulogne-Billancourt (FR)

( * ) Notice: Subject to any disclaimer, the term of this patent is extended or adjusted under 35 U.S.C. 154(b) by 810 days.

(21) Appl. No.: 12/224,188

(22) PCT Filed: Feb. 22, 2007

(86) PCT No.: PCT/EP2007/051714
§ 371 (c)(1),
(2), (4) Date: Aug. 20, 2008

(87) PCT Pub. No.: WO2007/096407
PCT Pub. Date: Aug. 30, 2007

(65) Prior Publication Data
US 2009/0136021 A1 May 28, 2009

(30) Foreign Application Priority Data
Feb. 27, 2006 (EP) .................................... 06447028

(51) Int. Cl.
*H04M 1/00* (2006.01)
(52) U.S. Cl. .............. 379/413.02; 379/88.17; 379/93.05

(58) Field of Classification Search ............... 379/88.17, 379/93.05, 413.02
See application file for complete search history.

(56) References Cited

U.S. PATENT DOCUMENTS

| 6,115,604 A * | 9/2000 | Lester et al. ............... 455/422.1 |
| 6,181,777 B1 * | 1/2001 | Kiko ........................... 379/32.04 |
| 6,549,610 B2 * | 4/2003 | Kikui ........................ 379/29.01 |
| 6,683,951 B1 | 1/2004 | Getchell |
| 6,788,667 B1 * | 9/2004 | Beresin ....................... 370/338 |
| 6,987,988 B2 * | 1/2006 | Uchiyama .................... 455/557 |
| 2002/0196774 A1 | 12/2002 | Wissing et al. |
| 2003/0137973 A1 | 7/2003 | Kim et al. |

FOREIGN PATENT DOCUMENTS
CN 1427610 7/2003
WO WO 01/89262 11/2001

OTHER PUBLICATIONS
Search Report Dated Jul. 10, 2007.

* cited by examiner

*Primary Examiner* — Simon Sing
(74) *Attorney, Agent, or Firm* — Tutunjian & Bitetto, P.C.

(57) ABSTRACT

The present invention concerns a device comprising a first interfacing means for linking to a residential phone wiring and a second interfacing means for accessing a network, the residential phone wiring being connected to a first phone subscriber line interface means located in a central office, the residential phone wiring comprising plugging means for connecting at least a first analogue phone. The device comprises second phone subscriber line interface means for providing phone services over the network and means for coupling the first phone to the second phone subscriber line interface means when the residential phone wiring is disconnected from the first phone subscriber line interface means.

9 Claims, 6 Drawing Sheets

DEVICE PROVIDING PHONE SERVICES TO PHONES PLUGGED TO A RESIDENTIAL PHONE WIRING THAT IS NOT COUPLED TO A CENTRAL OFFICE TELEPHONE EXCHANGE

This application claims the benefit, under 35 U.S.C. §365 of International Application PCT/EP2007/051714, filed Feb. 22, 2007, which was published in accordance with PCT Article 21(2) on Aug. 30, 2007 in English and which claims the benefit of European patent application No. 06447028.9, filed Feb. 27, 2006.

BACKGROUND

1. Technical Field

The present invention relates to device that provides phone services to phones plugged to a residential phone wiring that is not coupled to a central office.

2. Description of Related Art

On a local loop, where a telephone exchange is connected to a phone located on customer premises, the analogue voice services, or plain old telephone service, noted POTS, typically use the 300 Hz to 3400 Hz frequency range. The digital subscriber line technology uses the upper frequencies and permits to bring information over the copper wire that was originally intended only for the voice transport over the public switched telephone network. Customer premises receive the analogue phone services on the lower frequency band, and data services on the upper frequency band. It requires a DSL modem to communicate with the digital subscriber line access multiplexer, noted DSLAM, located in the local phone company's central office. It also usually requires the analogue phones to be plugged to the residential phone wire through a low pass filter. Then the analogue phone is coupled to the phone service central office, or foreign exchange station, noted FXS, and the DSL modem is coupled to the DSLAM. On the same local loop, two channels coexist: the analogue phone channel and the DSL channel.

The DSL technology permits the customer premises to access the Internet through the internet protocol, noted IP. Usually, a DSL gateway located in the premises comprises a LAN interface and devices connected to the LAN may access the Internet. They may run different kinds of applications such as voice over IP, noted VoIP. VoIP is performed with applications running on personal computers or with dedicated VoIP terminals connected to the LAN. The LAN may be a wired network such as an Ethernet network or a wireless network such as a WiFi network. The voice service with VoIP is not using the public switched telephone network; it is running over Internet.

Some gateways comprise an analogue phone interface, or FXS interface, allowing to connect an analogue phone. This permits the phone to be coupled to the FXS located in the central office in order to access the POTS services, and to use the same phone services as the analogue phones plugged to the residential phone wire. Some gateways also comprise phone subscriber line interface means, and act as a FXS. This permits the phone connected to the FXS interface of the gateway to be coupled to the FXS located in the gateway, and perform voice services with VoIP.

When the customer premises are no longer connected to the telephone service central office, the phones plugged to the residential phone wire can no longer access the POTS services. A gateway that comprises subscriber line interface means still permits the phone plugged to the FXS interface to perform voice service with VoIP. To authorize the phones plugged to the residential phone wire to perform voice services with VoIP through the gateway, a possibility is to connect the entire residential phone wire to the FXS interface of the residential gateway. This requires the gateway to be located at the same place as the MPOE, and to connect the entire residential phone wire to the FXS interface of the gateway.

SUMMARY

The present invention concerns a device that permits the phones linked to the residential phone wire to perform voice services without having to modify the residential phone wiring, when the customer premises are no longer connected to the telephone service central office.

To this end, the invention relates to a device comprising a first interfacing means for linking to a residential phone wiring and a second interfacing means for accessing a network, the residential phone wiring being connected to a first phone subscriber line interface means located in a central office, the residential phone wiring comprising plugging means for linking at least a first analogue phone.

According to the invention, the device comprises second phone subscriber line interface means for providing phone services through the network and means for coupling the first phone to the second phone subscriber line interface means when the residential phone wiring is disconnected from the first phone subscriber line interface means.

Surprisingly, the device does not require any modification in the residential phone wiring. The device of the invention is plugged to the residential phone wiring and all the phones plugged to the residential phone wiring may access the phone service through the phone subscriber line interface means of the device. This is of course enabled if the residential phone wiring is disconnected from the phone subscriber line interface means located in the central office.

According to an embodiment, the device comprises third interfacing means for linking a second analogue phone, and means for coupling the second phone to the second phone subscriber line interface means when the residential phone wiring is disconnected from the first phone subscriber line interface means.

According to an embodiment, the device comprises means for coupling the second phone to the first phone subscriber line interface means, the residential phone wiring being connected to the first phone subscriber line interface means.

According to an embodiment, the device comprises means for coupling the second phone to the second phone subscriber line interface means, the residential phone wiring being connected to the first phone subscriber line interface means.

The device comprises an interface to allow the connection of a phone directly to the device. The phone may have access to the phone services provided by the device or by the central office.

According to an embodiment, the device comprises switching means for switching among the following functions:
  coupling the first phone and the second phone to the first phone subscriber line interface means, or
  coupling the first phone and the second phone to the second phone subscriber line interface means, or
  coupling the first phone to the first phone subscriber line interface means and the second phone to the second phone subscriber line interface means.

The device does not provide the access to the various phone services simultaneously. It provides various modes where a phone may access a selected kind of phone service, mainly depending on the configuration of the residential phone wiring.

According to an embodiment, the switching means is a switch. The switch permits to select the correct position directly on the device.

According to an embodiment, the device comprises remote management means for controlling the switching means. The remote management means permit to select the correct position from a remote location.

According to an embodiment, the device comprises a digital subscriber line interface to couple the device to a digital subscriber line access multiplexer located in the central office. The second phone subscriber line interface means then provide the phone service over the DSL connection.

According to an embodiment, the device comprises means for providing voice over IP services. The second phone subscriber line interface means then provide the phone service with voice over IP.

BRIEF DESCRIPTION OF THE DRAWINGS

The invention will be better understood and illustrated by means of the following embodiment and execution examples, in no way restrictive, with reference to the appended figures among which.

Figure 3:
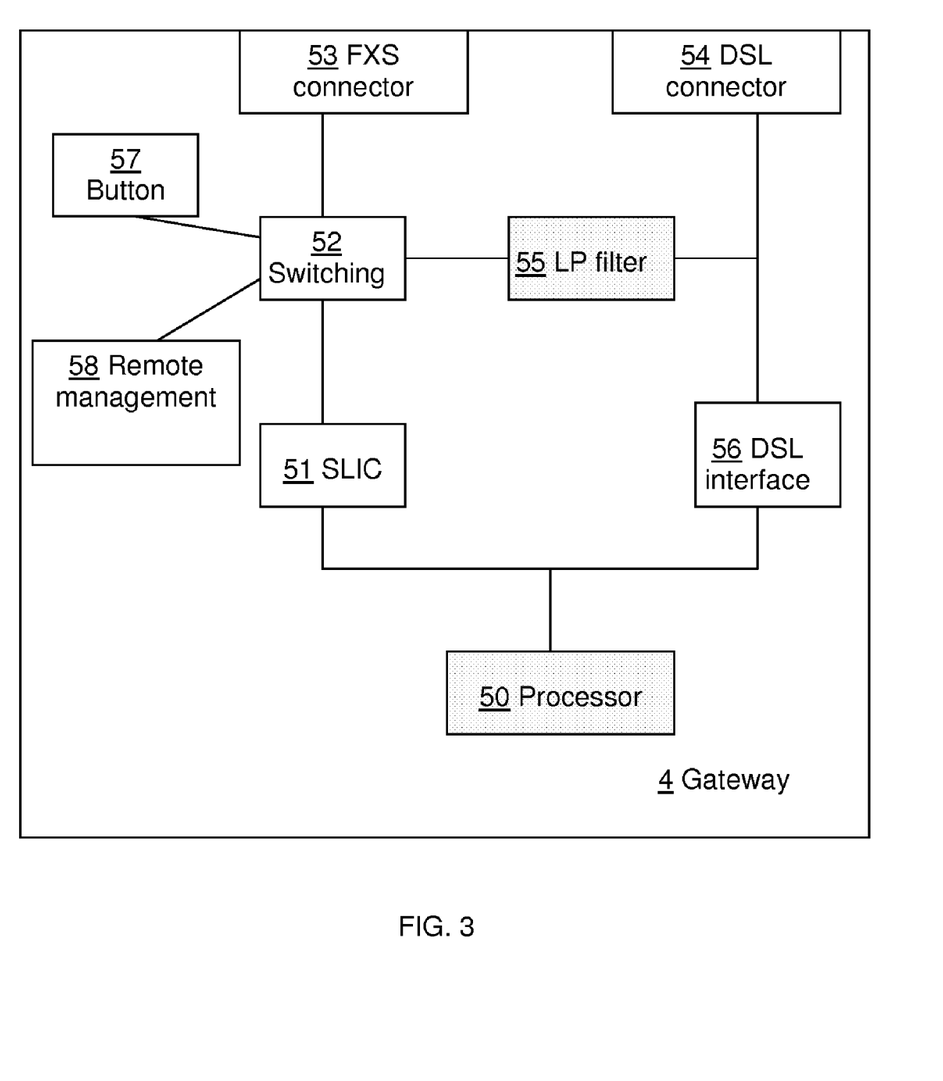
FIG. 3 is a block diagram of the modules of the device according to the embodiment.

In FIG. 3, the represented blocks are purely functional entities, which do not necessarily correspond to physical separated entities. Namely, they could be developed in the form of software, or be implemented in one or several integrated circuits.

DETAILED DESCRIPTION

Figure 1:
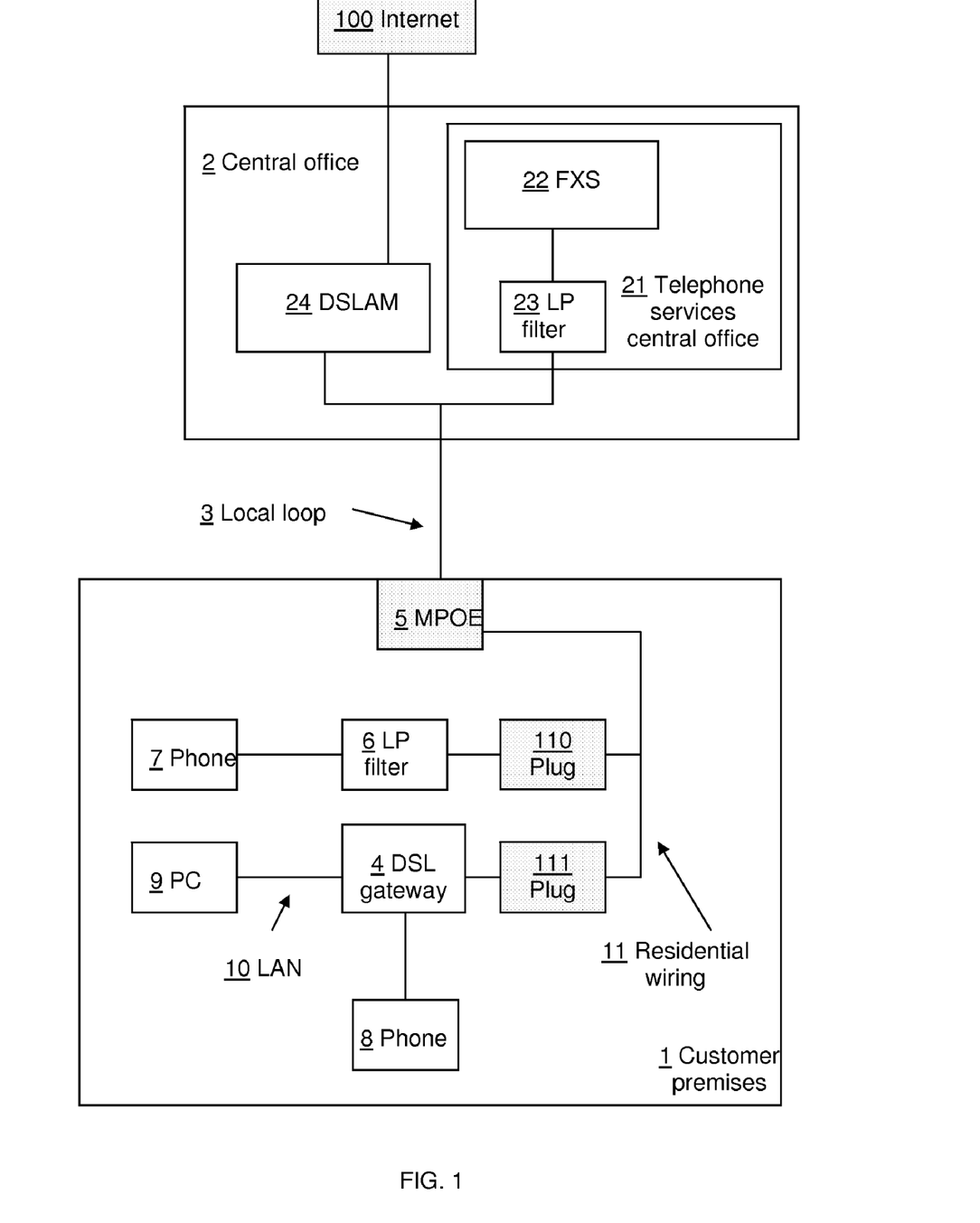
FIG. 1 is a block diagram of premises connected to a central office.

The FIG. 1 represents the local loop 3 between customer premises 1 and a central office 2 to which the customer premises are connected. In the embodiment the local loop is a pair of copper wires.

The central office 2 comprises a digital subscriber line access multiplexer 24, noted DSLAM, and a telephone services central office 21. The DSLAM intends to couple to the DSL gateway 4 located in the customer premise; which means that the DSL modem registers to the DSLAM and is associated with the DSLAM in a point to point connection. It offers DSL services to the DSL gateway. It permits the customer to access the Internet 100.

The telephone central office 21 comprises a foreign exchange station 22, noted FXS. The FXS is connected to the local loop with a low pass filter 23; which is required because of the presence of the DSL connection on the local loop. This prevents the higher tones of the DSL from disturbing the working of the analogue phone service. The FXS 22 acts as a telephone exchange towards the phone 7 connected to the local loop: the phone 7 is coupled to the FXS, it receives the phone subscriber line services from the FXS.

The FXS comprises a phone subscriber line interface circuit, noted SLIC, not represented on the figure. The SLIC performs the BORSCHT functions; BORSCHT standing for battery, overvoltage, protection, ringing, supervision, codec, hybrid, and testing. The SLIC might be implemented into a line card or in an integrated circuit.

In the embodiment, the FXS provides access to the POTS services. The invention is however not limited to the POTS and is also applicable to other analogue phone technologies such as wideband telephony.

The customer premises comprise an interface between the local loop and the residential phone wire, the minimum point of entry 5, noted MPOE. The residential phone wire 11 contains several plugs, 110, 111, in order to connect a phone or a DSL device such as a DSL gateway or a DSL modem. The plug is for example a standard connector, noted RJ-11, and might be any other kind of electrical connector intended for telephony or data. The phone devices connected to the plug may be a wired phone or a cordless phone. A base station such as a DECT base station attached to the plug permits to connect several DECT terminals. Hereafter in the document, the phone represents all the devices intended to transmit and receive voice frequency signals. It includes for example the phone, a DECT system including the base station and the cordless phone.

In the configuration of the embodiment, the DSL gateway is connected to the customer premises through the DSL interface; 'DSL' standing for all the members of the xDSL family. A phone 7 is also connected to the residential phone wire through a low pass filter 6. The DSL gateway 4 comprises a LAN interface in order to provide the access to the Internet 100 to all the devices, such as a PC 9, connected to the LAN 10.

The gateway comprises an interface for connection to a phone 8. The interface is a FXS interface. The phone may access the POTS service provided by the FXS located in the central office 22. The phone 8 may also access the voice services provided by the gateway; the phone 8 is then not coupled to the FXS located in the central office 22, it is coupled to the FXS located in the gateway 4. The gateway then performs VoIP through the DSL connection. According to the embodiment the FXS interface is optional.

Figure 2:
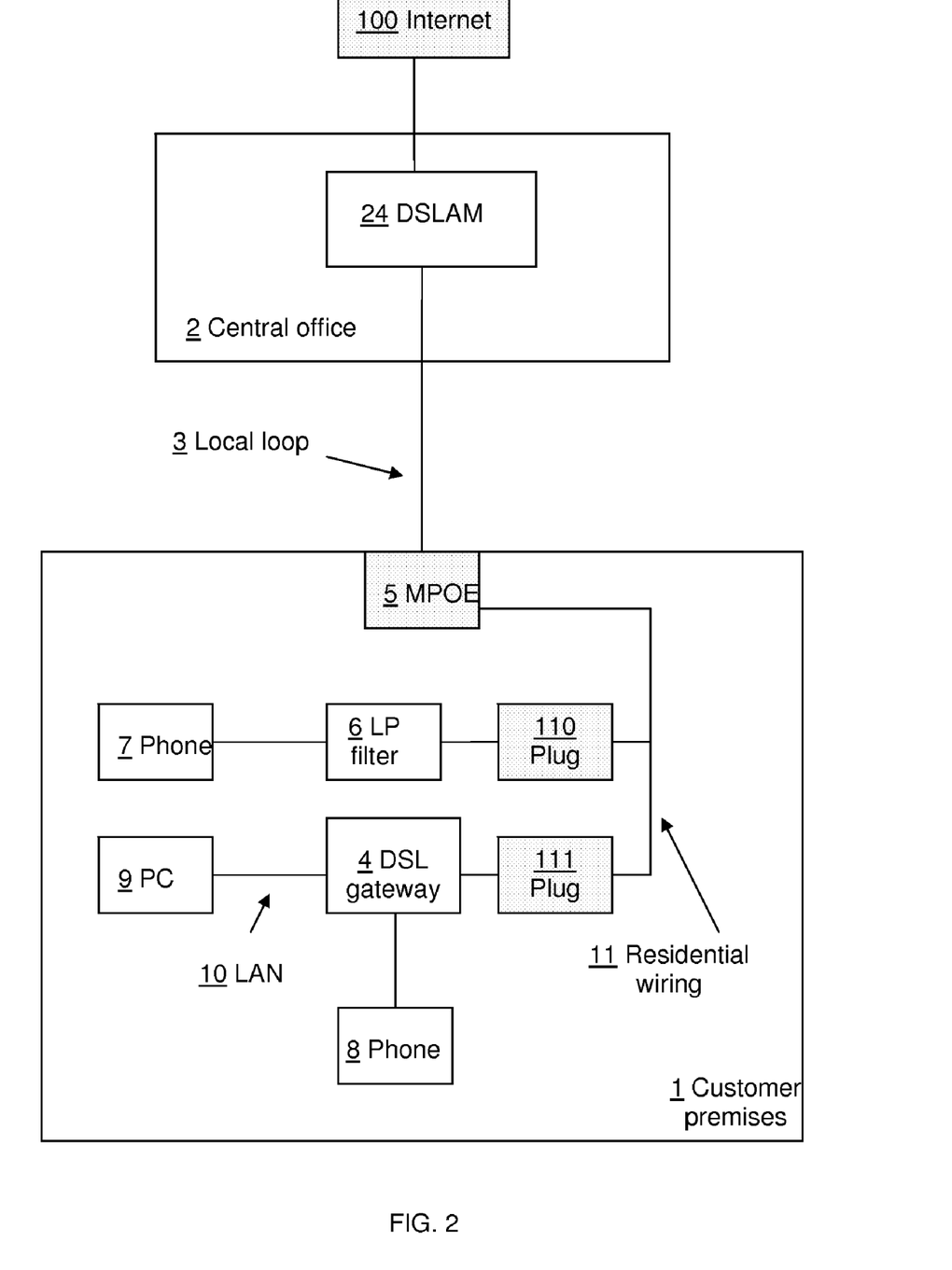
FIG. 2 is a block diagram of premises connected to a central office.

The FIG. 2 represents the customer premises 1 which are no longer connected to the phone service central office 21. They are only connected to the DSLAM 24. The phone 7 plugged to the residential phone wire can no longer access the POTS services provided by the central office. According to the embodiment, it may access voice services provided by the gateway 4.

The FIG. 3 represents the gateway device 4 according to the embodiment.

The first interfacing 54, which is a DSL connector, intends to connect the gateway 4 to the residential phone wire. An example of the connector is a RJ11 connector.

The second interfacing 56, which is a DSL interface, permits to couple the gateway to a DSLAM. It comprises a High Pass filter, an analogue Front End, an analogue to digital converter and digital to analogue converter, and a digital signal processor, not represented. The gateway has then access to Internet through the DSLAM. In another embodiment, the interface 56 might be another type of interface that permits the device to interface to another broadband access; some examples of broadband access being among others a cable network, a satellite network or a wireless LAN broadband access compliant for example to the WiFi or WIMAX standards.

The gateway comprises an internal Low Pass filter 55, which is a passive, analog filter with coils and capacitors not represented.

A third interfacing 53, which is a FXS interface, allows the connection of a phone to the gateway.

The SLIC 51 performs the phone subscriber line interface functions, and provides such functions to a phone device connected to the FXS interface or to a phone plugged to the residential phone wire. The phone subscriber line interface module provides the BORSCHT functions.

The processor 50 comprises VoIP processing means. The different modules of the device might be driven by this processor or by another processor.

A switch 52 permits to switch between different positions, in order for the device to provide different kinds of services. The switch is accessed by a button 57 located on the device. It can also be accessed by a remote management module 58. According to the embodiment the switch comprises three positions. Each position permits the device to provide a specific service. The first, second and third positions are respectively represented in the FIGS. 4, 5 and 6.

The device also comprises a LAN interface, not represented, to connect to the LAN in the premises and to provide an Internet access to the devices connected to the LAN. The LAN interface might be for example an Ethernet or a WiFi interface.

Figure 4:
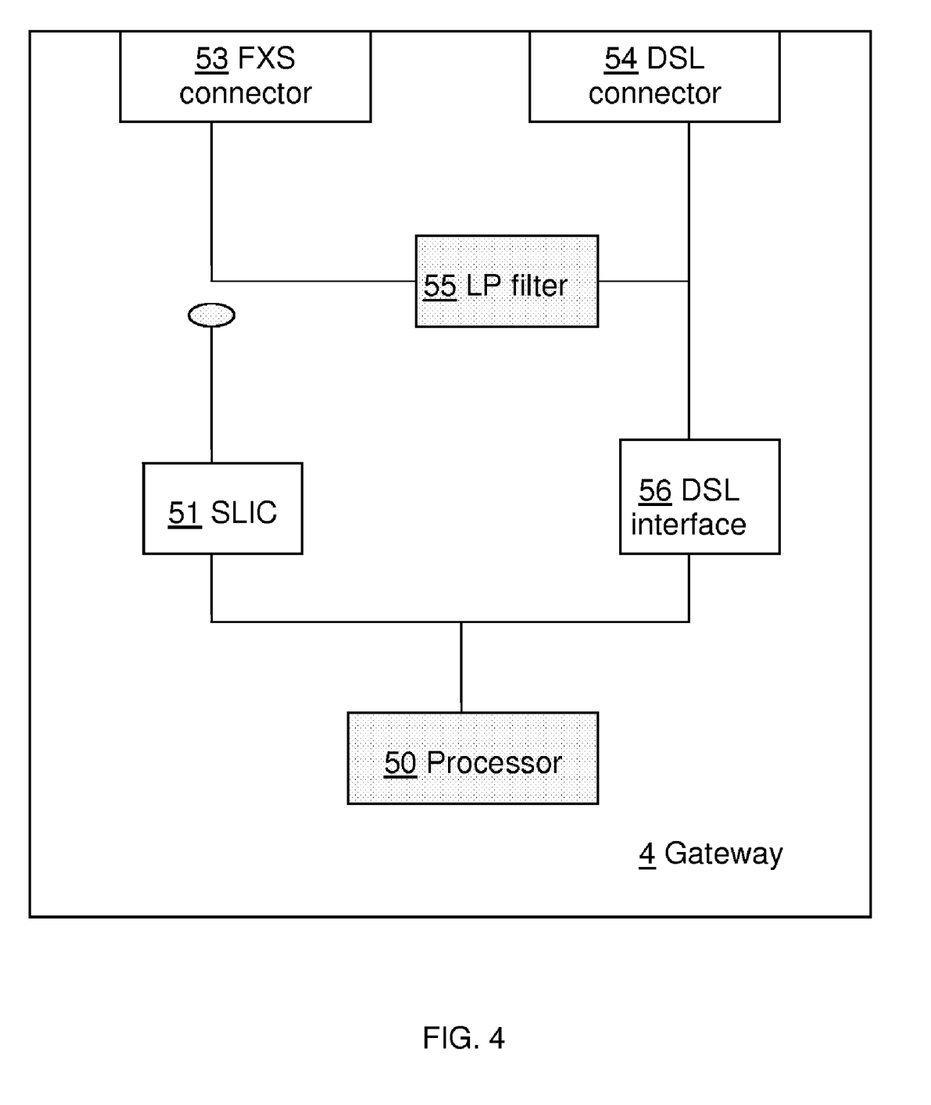
FIG. 4 is a block diagram of the device corresponding to the switch in the first position.

In the first position of the switch, as represented in the FIG. 4, the SLIC module 51 is not used. The FXS interface 53 is linked to the LP filter 55. In this position the gateway provides a service noted hereafter the service1. With the service1, a phone plugged to the FXS port behaves as if it were plugged to the residential phone wire. The phone is coupled to the FXS located in the central office. In this position the phones plugged to the residential phone wire are coupled to the FXS located in the central office.

Figure 5:
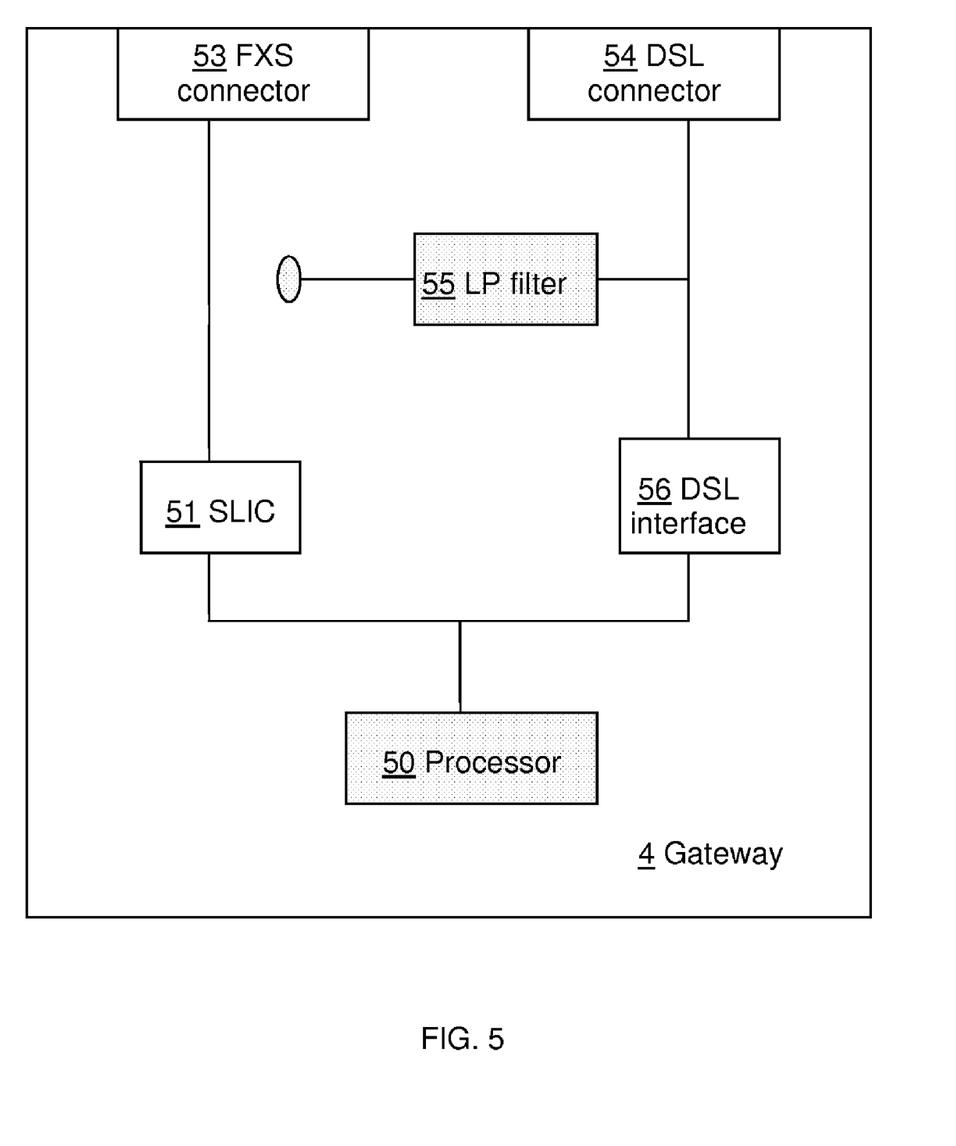
FIG. 5 is a block diagram of the device corresponding to the switch in the second position.

In the second position of the switch, as represented in the FIG. 5, the LP filter 55 is not used. The FXS port 53 is connected to the SLIC module 51. In this position the gateway provides a service noted hereafter the service2. A phone plugged to the FXS port couples to the SLIC module and performs the voice services with VoIP. The device acts as a FXS towards the phone.

The residential phone wire may or may not be coupled to the FXS located in the central office. In the former case, the phones connected to the residential phone wire may perform voice services through the FXS. In the latter mode, the phones connected to the residential phone wire may not perform any voice service.

Figure 6:
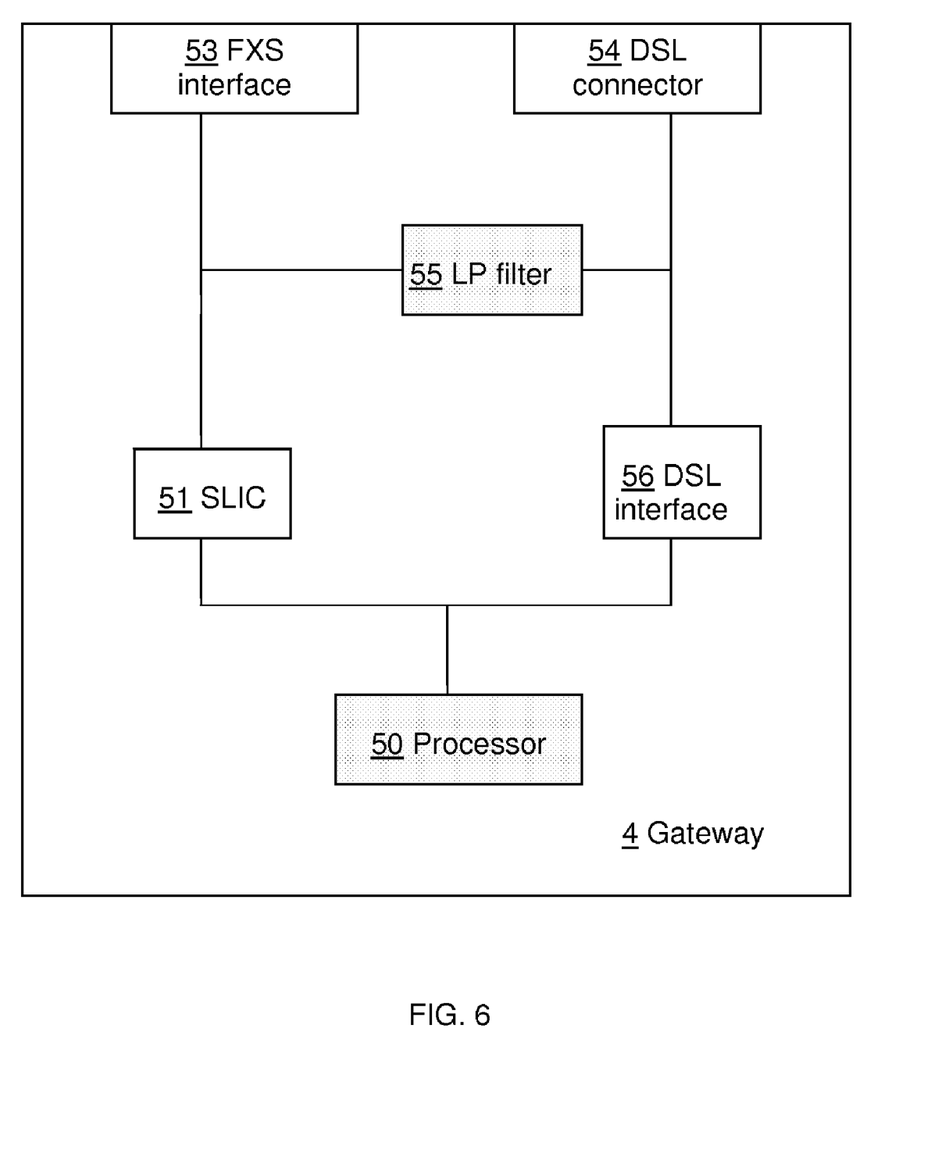
FIG. 6 is a block diagram of the device corresponding to the switch in the third position.

In the third position of the switch, as represented in the FIG. 6, the FXS interface 53, the LP filter 55 and the SLIC module 51 are linked together. In this position the gateway provides a service noted hereafter the service3. A phone plugged to the FXS port 53 is coupled the SLIC module 51. All the phones plugged to the residential phone wire are coupled the SLIC module 51. The VoIP is performed through the DSL connection. In another embodiment, the VoIP might be performed through the other type of broadband connection A phone is plugged to the residential phone wire through a LP filter. The LP filter 55 is connected to the SLIC 51 in the gateway; this permits the phone to couple with the SLIC module 51. The device acts as an FXS to the phones connected to the residential phone wire; the functions of the SLIC module of the device are available for all the phones connected to the residential phone wire.

The service3 is not applicable if the customer premises are connected to the phone service central office.

The device might not comprise a FXS port. The device would anyway act as a FXS towards all the devices plugged to the residential phone wire and allow them to access the voice services with VoIP.

The device, in all the positions of the switch as described above, may be plugged to any connector of the residential phone wire.

The switch is a change-over contact unit. It may be accessed through a switch that permits to select between the three positions. The switch has three different positions. It is up to the user to select the correct position, depending on the required service.

The switch may be managed by software. The access to the switching means may be done by the user through a user interface located in the device. The access to the software switching means may be done by remote management means by a user or by an operator.

In another embodiment, the switch is automatically configured by the device as described below. An operator, an Internet or POTS service provider, may control the phone service used by the customer. While the POTS service is still available the phones in the customer premises are connected to the POTS service. The operator controls this by disabling the VoIP service till the POTS service is disabled.

To migrate from the POTS service to the VoIP only service, the service provider performs the following. It sets the device into a 'voice configuration' state prior to migrating from the POTS to VoIP. During this state, corresponding to the time between disconnecting the POTS service and enabling the VoIP service, no calls are possible. This is transparent to the customer, as the period is very short. This might be indicated to the customer on a user interface, with for example some LEDs on the device indicating the registration to the POTS, to the VoIP or to no voice service at all. The procedure to migrate the voice service is as follows:

The service provider disconnects the POTS service on the central office, and it enables the VoIP service on a VoIP server managed by the operator. It registers the phone number of the customer in the server; and may activate or suspend the VoIP service.

When the VoIP mode is activated, the device, which regularly checks the activation of the VoIP service, detects the launch of the service and automatically registers with the VoIP service. It then changes the switch to the third position, connecting the FXS port and the LP filter to the SLIC. All phones connected to the residential phone wire are then coupled to the FXS located in the gateway.

Of course the operator might migrate from the VoIP to the POTS service in a similar manner.

The invention claimed is:

1. A device comprising a first interfacing means configured for connecting a first analog telephone coupled to the device with a first analog telephone interface located at a central office via a residential telephone wiring, the device having a second interfacing means configured for accessing a digital network through the central office via the residential telephone wiring, said residential telephone wiring comprising more than one plugging means for connecting at least a second analog telephone and the first interfacing means of said device in parallel to the residential telephone wiring, wherein said device comprises a second analog telephone subscriber line interface means providing an interface to an analog telephone; and means for providing telephone services through the digital network via said second analog telephone subscriber line interface means to said second analog telephone that is connected to the first interfacing means via the residential telephone wiring when the residential phone wiring is-not connected to the first analog telephone subscriber line interface means located in the central office, said device being connected to any one of said more than one plugging means of the residential telephone wiring.

2. The device of claim 1, further comprising switching means for coupling the first analog telephone coupled to the device to the second analog telephone subscriber line interface means located in the device when the residential telephone wiring is not connected to the first analog telephone subscriber line interface means located in the central office.

3. The device of claim 2, wherein said switching means is user controllable by a switch.

4. The device of claim 2, further comprising remote management means for controlling said switching means.

5. The device of claim 1, further comprising switching means for selectively establishing the following connections:

connecting the first analog telephone and the second analog telephone to the first analog telephone subscriber line interface means located in the central office, or connecting the first analog telephone and/or the second analog telephone that is coupled to one of the more than one plugging means of the residential telephone wiring to the second analog telephone subscriber line interface means located in the device.

6. The device of claim 5, wherein said switching means is user controllable by a switch.

7. The device of claim 5, further comprising remote management means for controlling said switching means.

8. The device of claim 1, further comprising a digital subscriber line interface for coupling said device to a digital subscriber line access multiplexer located in the central office.

9. The device of claim 1, further comprising means for providing voice over IP services.

* * * * *